United States Patent [19]

Kunstmann et al.

[11] 3,728,448

[45] Apr. 17, 1973

[54] ANTIBIOTIC BL617 AND PROCESS FOR PRODUCING SAME

[75] Inventors: Martin Paul Kunstmann, Pearl River, N.Y.; Charles Brainerd Williamson, III, Gainesville, Fla.; John Norman Porter, Ramsey, N.J.

[73] Assignee: American Cyanamid Company, Stamford, Conn.

[22] Filed: Apr. 6, 1971

[21] Appl. No.: 131,745

[52] U.S. Cl. ................................................424/121
[51] Int. Cl. ............................................A61k 21/00
[58] Field of Search .......................424/121; 195/80

[56] References Cited

UNITED STATES PATENTS

| | | | |
|---|---|---|---|
| 3,592,926 | 7/1971 | Shu et al. | 424/121 |
| 3,595,955 | 7/1971 | Boer et al. | 424/121 |

*Primary Examiner*—Jerome D. Goldberg
*Attorney*—Edward A. Conroy, Jr.

[57] ABSTRACT

This disclosure describes a new antibiotic, designated BL617, produced in a microbiological fermentation under controlled conditions using a strain of *Streptomyces luteoverticillatus*. The new antibiotic is active against a variety of microorganisms including fungi and thus is useful in inhibiting the growth of such microorganisms wherever they may be found.

4 Claims, 1 Drawing Figure

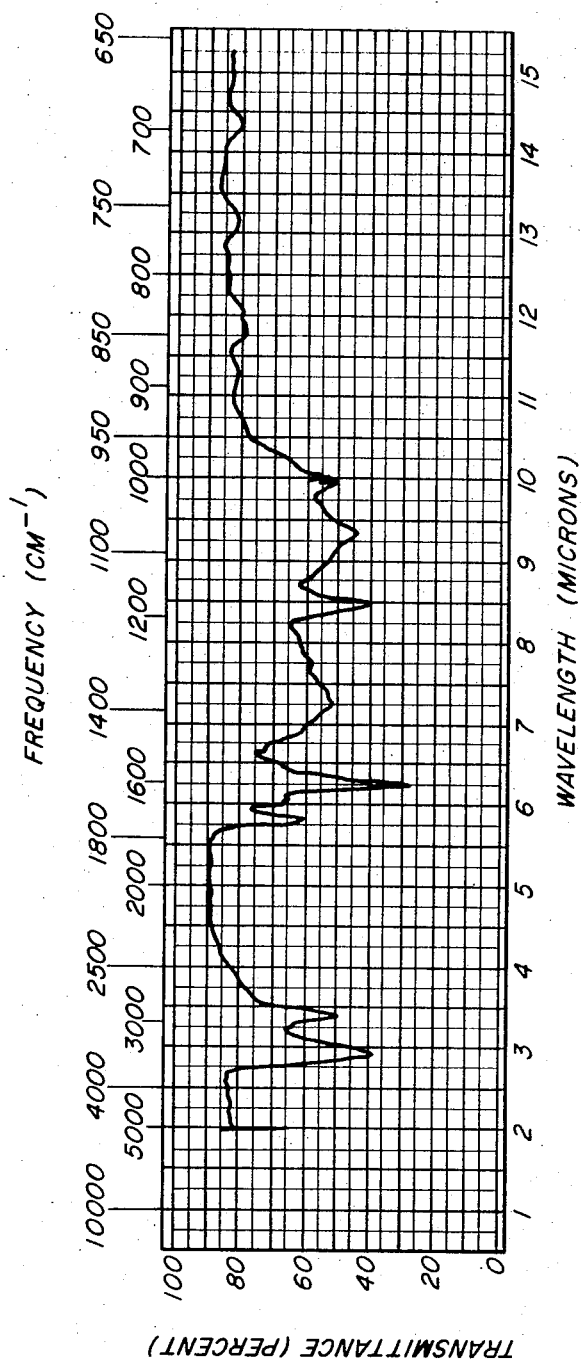
INVENTORS.
MARTIN PAUL KUNSTMANN
CHARLES BRAINERD WILLIAMSON III
JOHN NORMAN PORTER

ANTIBIOTIC BL617 AND PROCESS FOR PRODUCING SAME

BRIEF SUMMARY OF THE INVENTION

This invention relates to a new antibiotic, to its production by fermentation, to methods for its recovery and concentration from crude solutions, and to processes for its purification. The present invention includes within its scope the antibiotic in dilute form, as a crude concentrate, and in pure crystalline form. This novel product is active against a variety of microorganisms including fungi. The effects of the new antibiotic on specific microorganisms, together with its chemical and physical properties, differentiate it from previously described antibiotics.

DETAILED DESCRIPTION OF THE INVENTION

The new antibiotic, which we have designated BL617, is formed during the cultivation under controlled conditions of a strain of *Streptomyces luteoverticillatus*. The particular strain of *Streptomyces luteoverticillatus* which elaborates antibiotic BL617 has been described, based on diagnostic characteristics observed, by Ryuji Shinobu in an article entitled "Three New Species of Streptomyces Forming Whirls" published in the Memoirs of the Osaka University of the Liberal Arts and Education, B. Natural Science, No. 5 (1956). A viable culture of this strain of *Streptomyces luteoverticillatus* has been deposited with the Institute for Fermentation, Osaka, Japan, and has been added to its permanent collection as No. 3840. The microorganism is listed as Shinobu No. 486 in the third edition (1962) of the cultures on deposit with the Institute for Fermentation, Osaka, Japan.

THE FERMENTATION PROCESS

Cultivation of the organism *Streptomyces luteoverticillatus* may be carried out in a wide variety of liquid culture media. Media which are useful for the production of the novel antibiotic include an assimilable source of carbon such as starch, sugar, molasses, etc.; an assimilable source of nitrogen such as protein, protein hydrolysate, polypeptides, amino acids, corn steep liquor, etc.; and inorganic anions and cations such as potassium, sodium, ammonium, calcium, sulfate, phosphate, chloride, etc. Trace elements such as boron, molybdenum, copper, etc., are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1 percent octadecanol in lard oil, may be added as needed.

Inoculum Preparation

Shaker flask seed inoculum of *Streptomyces luteoverticillatus* is prepared by inoculating 100 milliliter portions of sterile liquid medium in 500 milliliter flasks with scrapings or washings of spores from an agar slant of the culture. The following medium is ordinarily used.

| | |
|---|---|
| Glucose | 20 grams |
| Soy flour | 10 grams |
| Corn steep liquor | 5 grams |
| Calcium carbonate | 3 grams |
| Water to | 1000 grams |

The flasks are incubated at a temperature at 25°–29°C., preferably 28°C., and agitated vigorously on a rotary shaker for 30 to 48 hours. These 100 ml. portions of seed inoculum are used to inoculate 1 liter and 12 liter batches of the same medium in 2-liter and 20-liter glass fermentors. The inoculum mash is aerated with sterile air while growth is continued for 30 to 48 hours. These batches of inocula in turn are used to inoculate tank fermentors.

Tank Fermentation

For the production of the antibiotic in tank fermentors, the following fermentation medium is preferably used.

| | |
|---|---|
| Corn starch | 30 grams |
| Corn steep liquor | 25 grams |
| Lard oil | 20 grams |
| Calcium carbonate | 9 grams |
| Ammonium sulfate | 3.3 grams |
| Water to | 1000 grams |

Each tank is inoculated with 3 to 10 percent of inoculum made as described above. Aeration is supplied at the rate of 0.5-1.0 liter of sterile air per liter of broth per minute, and the fermenting mixture is agitated by an impeller driven at 200–400 r.p.m. The temperature is maintained at 25°–29°C., usually at 28°C. The fermentation is ordinarily continued for 40 to 96 hours at which time the mash is harvested.

Isolation and Purification Procedure

After the fermentation is completed, the fermented mash containing the antibiotic of this invention is filtered, preferably at pH 6.0 to 7.0, to separate the mycelium. Diatomaceous earth or any other conventional filtration aid may be used to assist in the filtration. Normally, the mycelial cake is washed with water which, along with the filtrate, is discarded. The mycelial cake is then slurried with a one-third volume (as compared with the original mash volume) of methanol and the slurry is filtered. The mycelial cake is washed with a one-thirtieth volume of methanol. The combined methanol filtrate and wash is concentrated to a volume about one-thirtieth of the original mash volume, whereupon a yellow precipitate is deposited. This is recovered by filtration or centrifugation and the solids are washed with water, acetone, and petroleum ether, and air dried to give a solid preparation of the antibiotic.

The antibiotic may be further purified by liquid/liquid partition chromatography on cellulose using a carbon tetrachloride-chloroform-aqueous sodium acetate-methanol solvent system. The column eluate containing the antibiotic, located by ultraviolet absorption at 380 nm, is concentrated to a small volume whereupon a yellow precipitate is deposited. This precipitate is removed by filtration or centrifugation, washed with water, acetone, and petroleum ether, and dried in vacuo.

Alternatively or additionally, the antibiotic may be purified by countercurrent distribution using a chloroform-methanol-aqueous sodium acetate solvent system. The fractions containing the antibiotic, located by ultraviolet absorption at 380 nm, are combined and concentrated to a small volume. The resulting precipitate is removed by filtration or centrifugation, washed with water, acetone and petroleum ether, and dried in vacuo.

Physical Characteristics

Microanalytical samples were prepared from countercurrent-purified antibiotic by drying at room temperature overnight in vacuo ($10^{-3}$ mm) over phosphorous pentoxide. Antibiotic BL617 prepared in this manner contains the elements carbon, hydrogen, oxygen and nitrogen in substantially the following percentages by weight:

| | |
|---|---|
| Carbon | 60.72 |
| Hydrogen | 7.76 |
| Oxygen | 25.97 |
| Nitrogen | 2.34 |

The material does not have a definitive melting point, but slowly decomposes at temperatures above 150°C. It is optically active, having the following average rotations in the indicated solvents:

| Solvent | $[\alpha]_D^{25°}$ |
|---|---|
| Dimethyl sulfoxide | +169° (C=0.2) |
| Dimethyl formamide | +126° (C=0.2) |
| Pyridine | +231° (C=0.2) |

Antibiotic BL617 has the following average ultraviolet maxima with the indicated average $E_{1cm}^{1\%}$ values when measured in basic aqueous methanol (80 percent methanol, 20 percent 0.1N aqueous sodium hydroxide):

| nm | $E_{1cm}^{1\%}$ |
|---|---|
| 233 | 190 |
| 240 sh | 170 |
| 247 sh | 120 |
| 288 | 95 |
| 342 | 500 |
| 357 | 675 |
| 377 | 945 |
| 401 | 825 |

An infrared absorption spectrum of antibiotic BL617 in a KBr pellet, prepared in a standard manner, exhibits characteristic absorption maxima at the following wavelengths expressed in microns: 2.95, 3.30, 3.41, 5.82, 5.90, 6.08, 6.24, 6.46, 6.68, 6.88, 7.25, 7.41, 7.58, 7.75, 8.48, 9.1, 9.35, 9.95, 11.3, 11.8, 12.1, 13.2, and 14.4 The infrared curve of BL617 is shown in the accompanying drawing.

Methanolysis of antibiotic BL617 gave crystalline methyl mycosaminide hydrochloride indicating that the antibiotic contains mycosamine. Saponification of antibiotic BL617 gave the aromatic amine N-methyl-p-aminoacetophenone.

Antibiotic BL617 shows the following Rf values in the solvent systems indicated below using *Cryptococcus neoformans* as detecting organism:

| Rf Value | Solvent System |
|---|---|
| 0.20 | isoamyl alcohol (10 parts), 0.2M morpholine (7 parts), 0.2M acetic acid (3 parts). |
| 0.40 | chloroform (10 parts), pyridine (4 parts), acetic acid (4 parts), water (5 parts). |
| 0.83 | n-butanol (100 parts), isoamyl alcohol (50 parts), water (75 parts), dichloroacetic acid (1 part). |
| 0.92 | p-dioxane (50 parts), dimethylformamide (35 parts), dichloroacetic acid (1 part). |

ANTIMICROBIAL CHARACTERISTICS

The novel compound of the present invention is useful as an antifungal agent and possesses broad-spectrum antifungal activity in vitro against a variety of standard laboratory microorganisms as determined by the agar-dilution technique. In this assay, the compound to be tested is dissolved in dimethylsulfoxide so that 10.0 mg. of test compound is contained per milliliter of solution. Observing sterile techniques, 10-fold serial dilutions are made of the test solution. Two tenths ml., 0.1 ml. and 0.05 ml. amounts of the original solution and of each of the decimal dilutions are then added to and mixed with 20 ml. of warm sterile asparagine-meat extract agar capable of supporting growth of the fungal test cultures. The standard sterile nutrient agar solutions containing the different dilutions of the test compound, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. Using the Steers Replicator, a standardized amount of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of fungal growth is noted. The minimal inhibitory concentration (expressed in micrograms per milliliter) is defined as the concentration of test compound causing complete inhibition of growth of any particular organism.

In a representative operation, the minimal inhibitory concentration of the compound of this invention against standard laboratory microorganisms, as determined in the above-described assay, are set forth in Table I below:

TABLE I

| Organism | Minimal Inhibitory Conc. (mcg./ml.) |
|---|---|
| *Cryptococcus neoformans* E138, SP | 0.01 |
| *Candida albicans* ATCC 10231 | 0.05 |
| *Candida albicans* ATCC 10261 | 0.05 |
| *Candida mycoderma* ATCC 9888 | 0.025 |
| *Epidermophyton floccosum* ATCC 10227 | 0.25 |
| *Microsporum audouini* ATCC 14057 | 1.0 |
| *Microsporum canis* ATCC 11621 | 1.0 |
| *Microsporum gypseum* ATCC 14683 | 2.5 |
| *Phialophthora jeanselmei* ATCC 10224 | 2.5 |
| *Trichophyton mentagrophytes* NIH 666 | 5.0 |
| *Trichophyton rubrum* NIH 671 | 5.0 |
| *Trichophyton sulfureum* ATCC 10220 | 1.0 |
| *Trichophyton tonsurans* ATCC 10217 | 1.0 |

The high in vitro antifungal activity of the novel compound of the present invention makes it useful alone, or in combination with other antifungal agents, to prevent the growth of, or reduce the number of, such organisms as *Cryptococcus neoformans* and *Trichophyton tonsurans* present in various environments. It is thus useful in soaps, shampoos and topical compositions for the treatment of wounds and burns. Also, it is useful in wash solutions for sanitation purposes, as in the washing of hands and the cleaning of equipment or furnishings of contaminated rooms or laboratories.

The usefulness of antibiotic BL617 is also demonstrated by its ability to control systemic lethal infections of *Cryptococcus neoformans* in mice, as indicated by the following test. A lethal *Cryptococcus neoformans* infection was produced by intravenous injection (0.2 ml. of a 1:10 trypticase soy broth dilution from a 72 hour culture grown in trypticase soy broth on a rotary shaker at 30°C.) into Carworth Farms CF1-S white female mice. Antibiotic BL617 was suspended and diluted in 0.2 percent aqueous agar and dosed subcutaneously in a 0.5 ml. single dose within an hour after infection at the indicated levels. Groups of infected, untreated mice were used as controls to verify the lethality of the infection. Table II shows pooled results, expressed as percent survivors on the 14th day after infection, of several tests run according to the above described procedure.

TABLE II

| Subcutaneous dose mg./kg. | Alive/Total Mice 14 days post infection | Percent Survival |
|---|---|---|
| 25 | 10/10 | 100 |
| 12 | 17/20 | 85 |
| 6 | 4/10 | 40 |
| 3 | 11/30 | 37 |
| 1.5 | 4/10 | 40 |
| 0.8 | 2/30 | 7 |
| Infected, non-treated controls | 0/80 | 0 |

In addition to the above-mentioned antifungal activity, antibiotic BL617 has in vitro anti-trichomonal activity, inhibiting the growth of *Trichomonas vaginalis* in a suitable nutrient medium.

This invention will be described in greater detail in conjunction with the following specific examples.

EXAMPLE 1

Inoculum Preparation

A typical medium used to grow the primary inoculum is prepared according to the following formula:

| Glucose | 20 grams |
|---|---|
| Soy flour | 20 grams |
| Corn steep liquor | 5 grams |
| Calcium carbonate | 3 grams |
| Water to | 1000 milliliters |

The washed or scraped spores from an agar slant of a *Streptomyces luteoverticillatus* culture are introduced into two 500 ml. Erlenmeyer flasks containing 100 milliliters each of the above medium. The flasks are placed on a rotary shaker and agitated vigorously for 48 hours at 28°C. The resulting flask inoculum is transferred to a 5 gallon glass fermentor containing 12 liters of sterile medium. The inoculum mash is aerated with sterile air while growth is carried out for 48 hours, after which the contents are used to seed a 300 liter tank fermentor.

EXAMPLE 2

Fermentation

A fermentation medium is prepared according to the following formula:

| Corn starch | 30 grams |
|---|---|
| Corn steep liquor | 25 grams |
| Lard oil | 20 grams |
| Calcium carbonate | 9 grams |
| Ammonium sulfate | 3.3 grams |
| Water to | 1000 milliliters |

The fermentation medium is sterilized at 120°C. with steam at 20 pounds pressure for 60-90 minutes. The pH of the medium after sterilization is 6.3. Three hundred liters of sterile medium in a 400 liter tank fermentor is inoculated with 12 liters of inoculum prepared as described in Example 1, and the fermentation is carried out at 28°C. using Hodag LG-8 oil as a defoaming agent. Aeration is supplied at the rate of 0.5 liter of sterile air per liter of mash per minute. The mash is agitated by an impeller driven at 200 revolutions per minute. At the end of approximately 65 hours of fermentation time, the mash is harvested.

EXAMPLE 3

Isolation and Purification

Three hundred liters of fermented mash are filtered with the aid of about 3 percent (weight per volume) of diatomaceous earth. The mycelial pad is washed with about 30 liters of water and the filtrate and wash are discarded. The mycelial cake is slurried in 100 liters of methanol and the mixture is stirred for 30 minutes. The mixture is filtered, the mycelial pad is washed with an additional 10 liters of methanol and the methanol filtrate and wash are combined and concentrated to about 9 liters. Upon standing, a large amount of yellow precipitate forms. About 3 liters of this suspension are filtered and 6 liters are centrifuged. The solids from these procedures are combined and washed with water, acetone, and petroleum ether, and air-dried at room temperature to give a total of 128.5 grams of purified antibiotic.

Further purification of the above preparation of antibiotic is achieved by liquid-liquid partition chromatography. A slurry of 200 grams of cellulose power in the aqueous phase of the solvent system chloroform (14 parts), carbon tetrachloride (7 parts), 0.1M aqueous sodium acetate (10 parts), methanol (5 parts) is poured into a glass column (4.3 centimeters internal diameter) and the cellulose is allowed to settle. A filter paper disk is placed on top of the settled cellulose and the excess aqueous phase is displaced. A 2.038 gram sample of the purified antibiotic is slurried in organic phase, applied to the column, and the column eluate is continuously monitored at 380 nm and fractions of about 50 milliliters each are collected automatically. On the basis of the ultraviolet absorption profile, the desired antibiotic is located between fractions 48–120, mainly. These fractions are combined and concentrated in vacuo to an aqueous phase. This is further concentrated in vacuo in the presence of n-butanol to about 20–50 milliliters of aqueous phase whereupon a yellow solid forms. This is separated by filtration, washed well with water, acetone, and petroleum ether, and dried in vacuo overnight over phosphorous pentoxide to give 94 milligrams of nearly pure antibiotic BL617.

The above column is reused. A 5.555 gram sample of the purified antibiotic is slurried in the aqueous phase of the partition solvent system and mixed with 20 grams of cellulose powder. An additional 80 milliliters of aqueous phase is used to make a heavy slurry which is placed on top of the existing column. After the excess aqueous phase has seeped into the column, it is developed with organic phase as before. Following work up of the appropriate fractions as before, 512 milligrams of nearly pure antibiotic BL617 is obtained.

Antibiotic BL617 is further purified by countercurrent distribution in a 200 tube apparatus (10 milliliters of each phase per tube) with a solvent system (50 milliliters of each phase) and charged into tubes 1–5 of the apparatus. With the aqueous phase as the mobile phase, the aparatus is run a total of 240 transfers and the contents of various tubes are examined for ultraviolet absorption at 380 nm. By this technique, the antibiotic is located mainly in tubes 50–85 with the peak absorption about tube 70. The contents of these tubes are combined and concentrated in vacuo to an aqueous phase. This is further concentrated in vacuo in the presence of n-butanol to about 20–50 milliliters of aqueous phase whereupon a yellow solid forms. This is separated by filtration, washed well with water, acetone, and petroleum ether, and dried in vacuo overnight over phosphorous pentoxide to give 318 milligrams of antibiotic BL617.

We claim

1. Antibiotic BL617, a compound which
   a. is effective in inhibiting the growth of fungi; and in its essentially pure crystalline form
   b. has the following optical rotations: $[\alpha]_D^{25} = +169°$ (C=0.2 in dimethylsulfoxide), $[\alpha]_D^{25} = +126°$ (C=0.2 in dimethylformamide), $[\alpha]_D^{25} = +231°$ (C=0.2 in pyridine);
   c. has the following elemental analysis in percent by weight: C, 60.72, H, 7.76, O, 25.97, N, 2.34;
   d. has ultraviolet absorption maxima at: 233 nm ($E_{1cm}^{1\%} = 190$), 240 nm ($E_{1cm}^{1\%} = 170$) shoulder, 247 nm ($E_{1cm}^{1\%} = 120$) shoulder, 288 nm ($E_{1cm}^{1\%} = 95$), 342 nm ($E_{1cm}^{1\%} = 500$), 357 nm ($E_{1cm}^{1\%} = 675$), 377 nm ($E_{1cm}^{1\%} = 945$), 401 nm ($E_{1cm}^{1\%} = 825$); and
   e. has a characteristic infrared absorption spectrum as shown in the accompanying drawing.

2. A compound as defined in claim 1, antibiotic BL617, in its essentially pure form.

3. A process for the production of antibiotic BL617 which comprises cultivating *Streptomyces luteoverticillatus* IFO 3840 in an aqueous nutrient medium containing assimilable sources of carbohydrate, nitrogen and inorganic salts under submerged aerobic conditions until substantial antibiotic activity is imparted to said medium by the production of anbibiotic BL617, as defined in claim 1.

4. A process for the production of antibiotic BL617 which comprises cultivating *Streptomyces luteoverticillatus* IFO 3840 in an aqueous nutrient medium containing assimilable sources of carbohydrate, nitrogen and inorganic salts under submerged aerobic conditions for a period of from 40 to 96 hours and at a temperature of from 25°C. to 29°C. until substantial antibiotic activity is imparted to said medium by the production of antibiotic BL617, as defined in claim 1, and then recovering antibiotic BL617 therefrom.

* * * * *